United States Patent
Clohessy et al.

(10) Patent No.: US 9,205,738 B2
(45) Date of Patent: Dec. 8, 2015

(54) INTEGRATED WHEEL END SHIFT FORK COMPLIANT STOP

(71) Applicant: Warn Industries, Inc., Clackamas, OR (US)

(72) Inventors: Kip E. Clohessy, Milwaukie, OR (US); Erik O. Roe, Portland, OR (US); Richard L. Rickert, Sandy, OR (US); Steven W. Shuyler, Clackamas, OR (US)

(73) Assignee: Warn Industries, Inc., Clackamas, OR (US)

( * ) Notice: Subject to any disclaimer, the term of this patent is extended or adjusted under 35 U.S.C. 154(b) by 99 days.

(21) Appl. No.: 13/958,042

(22) Filed: Aug. 2, 2013

(65) Prior Publication Data

US 2015/0034445 A1    Feb. 5, 2015

(51) Int. Cl.
*B60W 10/119* (2012.01)
*B60K 23/08* (2006.01)

(52) U.S. Cl.
CPC .............. *B60K 23/08* (2013.01); *B60W 10/119* (2013.01); *B60K 2023/0866* (2013.01); *B60Y 2400/408* (2013.01); *B60Y 2400/42* (2013.01); *B60Y 2400/82* (2013.01)

(58) Field of Classification Search
CPC ................. B60K 2023/0866; B60Y 2400/406; B60Y 2400/408; B60Y 2400/421; B60Y 2400/42; B60Y 2400/82; B60W 10/119
USPC .............. 192/69.4, 69.41, 85.1, 85.03, 85.11, 192/85.18, 85.35, 109 A, 109 R; 74/473.37
See application file for complete search history.

(56) References Cited

U.S. PATENT DOCUMENTS

| | | | |
|---|---|---|---|
| 4,531,623 A * | 7/1985 | Arai et al. | 192/82 R |
| 4,997,074 A | 3/1991 | Larson et al. | |
| 5,141,088 A * | 8/1992 | Kurihara et al. | 192/69.41 |
| 5,740,895 A | 4/1998 | Bigley | |
| 5,772,285 A | 6/1998 | Bigley et al. | |
| 6,082,514 A | 7/2000 | Averill | |
| 6,109,411 A | 8/2000 | Bigley | |
| 6,170,628 B1 | 1/2001 | Bigley | |
| 6,234,289 B1 | 5/2001 | Baker et al. | |
| 6,371,268 B1 | 4/2002 | McMorris et al. | |
| 6,422,369 B1 | 7/2002 | McCalla | |
| 6,598,722 B2 | 7/2003 | Pugliese et al. | |
| 6,918,851 B2 * | 7/2005 | Ziech et al. | 475/221 |
| 7,143,883 B2 | 12/2006 | McCalla et al. | |
| 2003/0094344 A1 * | 5/2003 | Pugliese et al. | 192/69.41 |

OTHER PUBLICATIONS

ISA United States Patent and Trademark Office, International Search Report and Written Opinion of PCT/US2014/015473, May 30, 2014, 13 pages.

* cited by examiner

*Primary Examiner* — Rodney H Bonck
*Assistant Examiner* — Stacey Fluhart
(74) *Attorney, Agent, or Firm* — Alleman Hall McCoy Russell & Tuttle LLP

(57) ABSTRACT

A wheel end of a vehicle includes a knuckle and a wheel and wheel hub rotatably mounted to the knuckle. A CV-joint is positioned adjacent to the wheel hub. A clutch ring is slidable between engagement with one of the wheel hub and the CV-joint or both. A pneumatic annular actuator is connected to a shift fork that is engaged with the clutch ring for movement of the clutch ring between engaged and dis-engaged. The shift fork includes a base portion and an L-shaped section. The L-shaped section includes a plurality of slots therein to allow the shift fork to deflect and pivot when a misalignment occurs between the teeth of the constant velocity joint half shaft and the clutch ring during assembly of the CV-joint to the wheel hub. The pneumatic actuator includes an elastomeric diaphragm wall that includes a compliant stop extending axially therefrom.

16 Claims, 6 Drawing Sheets

INTEGRATED WHEEL END SHIFT FORK COMPLIANT STOP

FIELD

The present disclosure relates to an actuator for initiating the shifting action of a clutch to affect engagement/disengagement of drive and driven shafts.

BACKGROUND

This section provides background information related to the present disclosure which is not necessarily prior art.

In recent years it has become increasingly popular to provide vehicles with the ability to convert between two-wheel and four-wheel drive. As popularity has grown, so too have the many ways of affecting conversion. In one example there is a permanently driven drive line segment to the rear wheels of a vehicle, and a part-time driven drive line segment to the front wheels. The part-time driven drive line segment is simply disconnected/decoupled from the engine's drive shaft at the transmission or transfer case and that segment is rendered passive (undriven).

There is often a second point of disconnection which may be at or near the differential (a center disconnect) or at both wheels. There is a mechanical action that takes place to achieve each connection and disconnection as contemplated herein. Two shafts or drive line segments are in close relationship and a clutch ring that is permanently coupled to one shaft is slidable into engagement with the other shaft to couple the shafts and is slidable out of engagement with the other shaft to decouple the two shafts.

The sliding movement is achieved by what will here be referred to as an actuator. The actuator can be many types including, e.g., a shift lever, manual or electrically driven, it can be cam actuated and it can be pneumatically actuated.

Pneumatic actuators in general are not new. Pneumatic actuators of this kind are disclosed in commonly assigned U.S. Pat. Nos. 5,704,895; 6,109,411; and 6,234,289. In the above listed patents, the clutch ring and components to be coupled are rotating and the annular actuator is designed to shift a non-rotating member (referred to as a fork) that is placed in contact with the rotating clutch ring. The contact between the rotating clutch ring and fork is designed to form a bearing that permits rotation of the clutch ring while the entire actuator remains static. The annular configuration of the actuator which surrounds the juncture to be coupled enables the use of a greater surface area on which the air acts. Thus, the available air pressure (from the manifold) is being applied to the greater surface area and produces a greater accumulated force. The diaphragm that is used as the movable wall is made of material that conforms and seals against metal objects. Placing the diaphragm in an opening that needs otherwise to be sealed allows the diaphragm to serve dual purposes.

Having thus achieved a far more efficient air actuated clutch ring actuator, all or most of the actuators heretofore provided along the drive line are advantageously replaced with the annular actuator of the patented designs. Even with the improved performance and efficiency of the air actuated clutch ring actuator, additional improvements in the manufacture and assembly of the hub assembly have been developed. In particular, the present disclosure provides a compliant piston and shift fork assembly to reduce the risk of damage to the piston and shift fork assembly during assembly of the half shaft to the wheel end.

SUMMARY

This section provides a general summary of the disclosure, and is not a comprehensive disclosure of its full scope or all of its features.

A wheel end of a vehicle includes a knuckle and a wheel and wheel hub rotatably mounted to the knuckle. A constant velocity joint is positioned adjacent to the wheel hub. A clutch ring is slidable between positions of interlocked engagement with one of the wheel hub and the constant velocity joint and both of the wheel hub and constant velocity joint. A pneumatic annular actuator is positioned between the knuckle and the constant velocity joint and mounted to the knuckle. The actuator includes an air chamber having an elastomeric diaphragm wall movable upon pressurization and depressurization of the air chamber. The diaphragm wall is connected to a shift fork that is engaged with the clutch ring for movement of the clutch ring between the positions as the air chamber is pressurized and depressurized. An air passage extends into the air chamber and an air line connected to the passage and connected to an air pressure source for directing air into and out of the air chamber. The shift fork includes an annular base portion and an L-shaped section extending from the base portion. The L-shaped section includes a plurality of slots therein to allow the shift fork to deflect and pivot when a misalignment occurs between the teeth of the constant velocity joint and the clutch ring during assembly of the constant velocity joint to the wheel hub. The teeth will engage each other as soon as there is rotation of the shaft relative to the clutch ring.

According to a further aspect of the present disclosure, the elastomeric diaphragm wall includes a compliant stop extending axially therefrom at a location radially outward of the shift fork.

According to another aspect of the present disclosure, the shift fork can be provided with a compliant stop extending from the annular base portion and extending axially relative to an axis of the annular base portion at a location radially outward of the L-shaped section.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
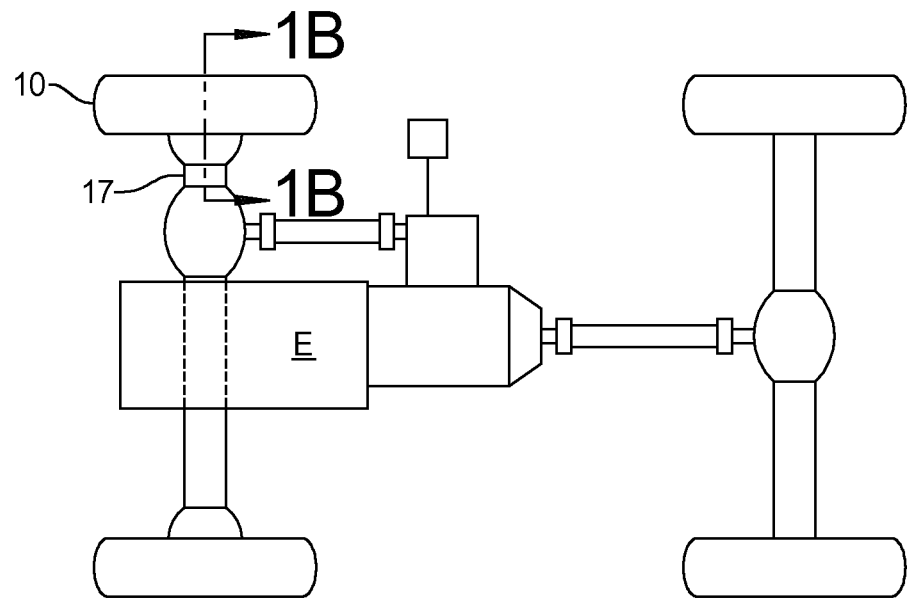
FIGS. 1A and 1B illustrate a vehicle and a wheel end of the vehicle for which the present disclosure is contemplated.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1B:
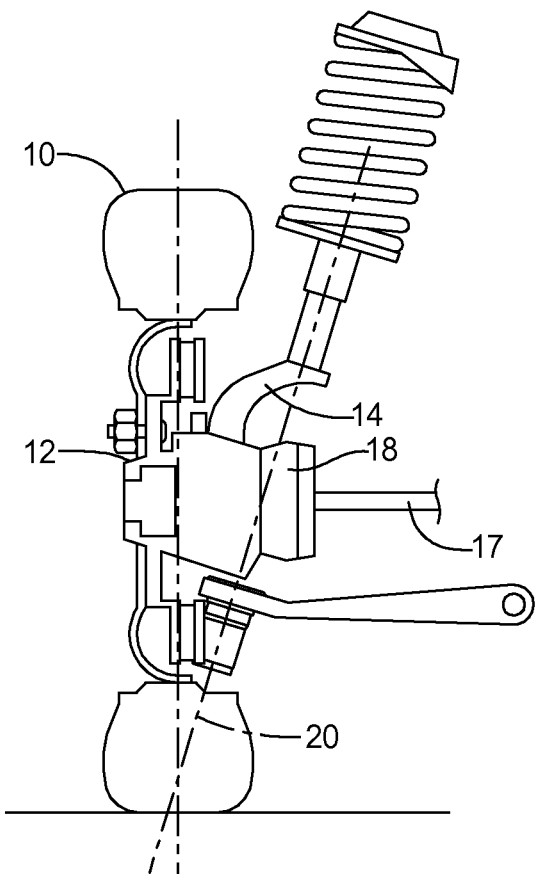

FIG. 1A schematically illustrates a vehicle chassis including front wheels 10 as may incorporate a clutch actuator assembly of the present disclosure. FIG. 1B is a partial view as taken along lines 1B-1B of FIG. 1A and illustrates a front wheel 10 having a hub 12 extended inward where it is supported by a steering knuckle 14. A bearing pack 16 (See FIG. 2) allows rotation of the wheel 10 relative to the steering knuckle 14. As noted in FIG. 1B, a drive axle 17 (of the vehicle drive train) connects to a CV-joint 18 which is secured to the knuckle as will be discussed hereafter. As well known to the industry, the CV-joint 18 is adapted to accommodate the pivotal axis 20 of the wheel 10 and knuckle 14 whereby turning of the front wheel is permitted while remaining in driving engagement with the axle 17.

Figure 2:
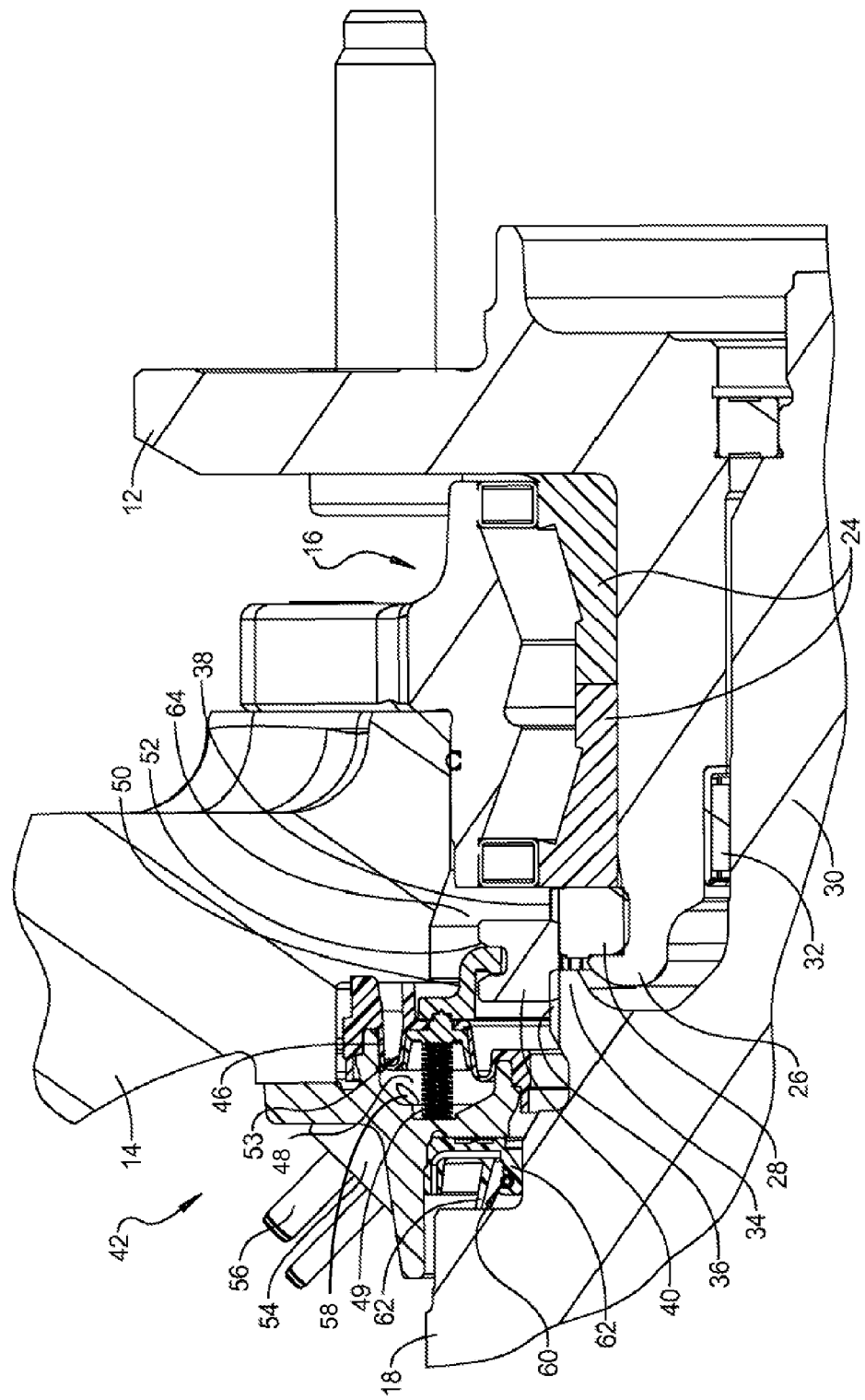
FIG. 2 is an enlarged illustration in cross section of the wheel end and components including an annular actuator designed in accordance with the present disclosure.

FIG. 2 is an enlarged cross sectional view of the wheel hub 12, knuckle 14 and CV-joint 18. As illustrated, the bearing pack 16 is bolted to the knuckle and the wheel hub 12 extends through the inner race 24 of bearing pack 16 with the inboard end 26 roll formed to secure a coupler 28 in abutting engagement with the inner race 24 and thereby the wheel hub 12 in engagement with the bearing pack 16 and knuckle 14.

The CV-joint 18 includes an axle portion 30 that is supported by bearing 32 to the inner side of the hub 12. The CV-joint 18 is configured to provide an annular portion 34 having splines 36 that are in mating alignment with splines 38 provided on coupler 28.

It will thus be apparent that the CV-joint 18 is rotatably supported in the hub 12 which is rotatably supported in the knuckle 14.

Figure 3:
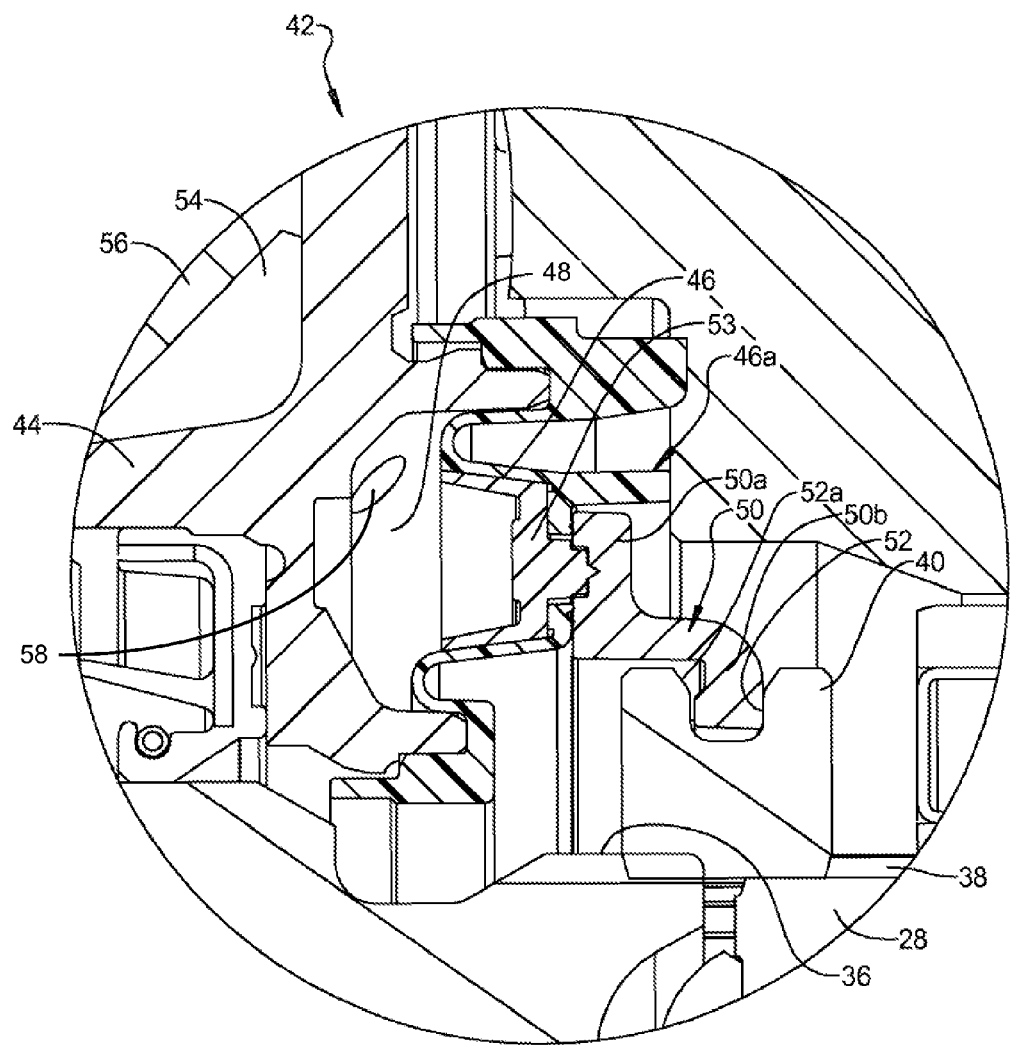
FIG. 3 is a partial cross section view showing a portion of the annular actuator and clutch ring shown in a normal engaged position.

A clutch ring 40 is shown in engagement with both spline sets 36, 38 of the CV-joint and the coupler 28, respectively. In this relation, the CV-joint (driven by axle 17) drives the wheel hub 12 and accordingly wheel 10. The clutch ring 40 is, however, slidable inwardly from the position of FIG. 2 to disengage from the coupler 28 thereby disengaging wheel 10 from the drive axle 17. Such sliding movement of the clutch ring 40 is provided by an annular actuator assembly 42, parts of which are shown also in FIGS. 3 and 4.

Figures 5, 6:
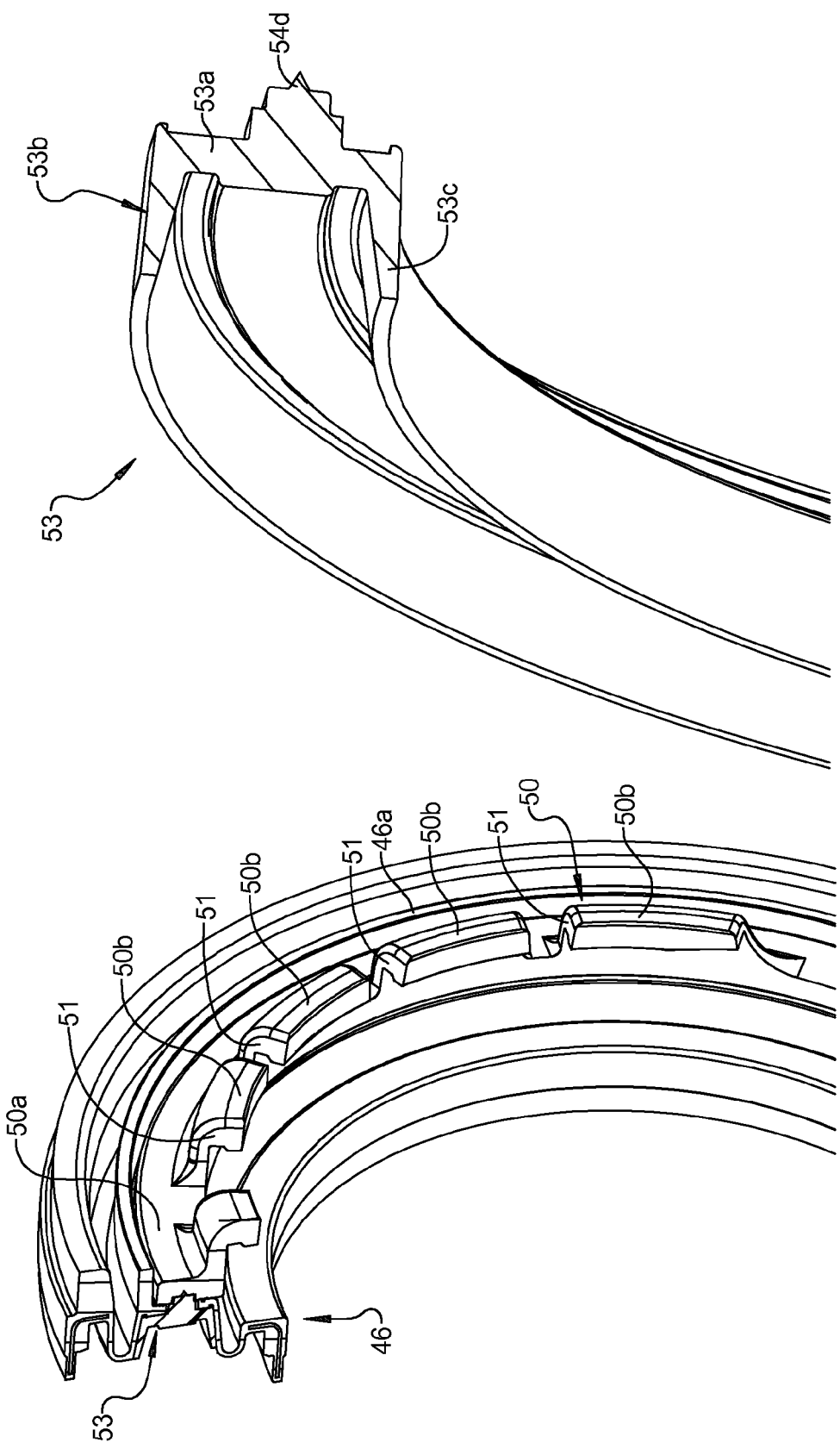
FIG. 5 is a partial cut-away perspective view of a diaphragm ring and slotted shift fork according to the principles of the present disclosure.
FIG. 6 is a partial cut-away perspective view of an annular piston according to the principles of the present disclosure.

The actuator assembly 42 includes a metal annular ring 44 and an opposing annular elastomeric diaphragm wall 46 which together define an air chamber 48. Secured to the elastomeric diaphragm wall 46 is a shift fork 50 which is engaged with a bearing groove 52 of the clutch ring 40. It will be noted that shift fork 50 does not rotate while the clutch ring 40 does. An annular piston ring 53 is connected to the elastomeric diaphragm ring 46 on an opposite side from the clutch ring 40. FIG. 6 is a partial cutaway perspective view of the piston ring 53. The piston ring 53 includes a base portion 53a, a pair of sidewalls 53b, 53c, and a protruding anchor portion that is connected to the shift fork 50 by known fixing techniques.

The diaphragm ring 46, shift fork 50 and bearing groove 52 are uniquely designed to be compliant to prevent damage to the actuator assembly 42 during assembly of the constant velocity joint half shaft 18. In particular, as the constant velocity joint 18 is inserted into the wheel hub 12, the internal spline teeth of the clutch ring 40 may be misaligned with the external spline teeth 36 on the annular portion 34 of the CV-joint 18. In order to accommodate for the possible misalignment during assembly, the elastomeric diaphragm wall 46 is provided with a dual stage stop feature 46a in the form of an axially extending annular protrusion of the elastomeric diaphragm wall 46. The dual stage stop feature 46a engages a side wall 14a of the knuckle 14 to generally limit the axial travel of the clutch ring 40, in a manner that is described in detail herein. The elastomeric stage of the dual stage stop 46a reduces the axial load on the splines of the clutch ring and constant velocity half shaft teeth 36 thereby allowing the teeth to engage each other as soon as there is a rotation of the CV joint shaft 18 relative to the clutch ring 40.

The shift fork 50 includes an annular base portion 50a and a partial-circular slotted L-shaped section 50b that is received in the bearing groove 52 of the clutch ring 40 to engage with and move the clutch ring 40 into and out of engagement with the coupler 28. The slots 51 between portions of the L-shaped section 50b allow the shift fork 50 to be deflected, as will be described herein. The bearing groove 52 of the clutch ring 40 is provided with a chamfered edge 52a to facilitate the radial movement of the L-shaped section 50b relative to the bearing groove 50.

Forming a part of the metal ring outer exterior is a boss 54. A passage 58 is provided through the boss and through the metal ring for coupling of an air line 56. The air line 56 is connected at its other end to an intake manifold of the vehicle's engine (not shown) to produce a negative air pressure in the chamber 48. When actuated, the negative air pressure draws the fork 50 inwardly relative to chamber 48 and the clutch ring 40 accordingly to cause the clutch ring 40 to disengage from the coupler 28 and thus allow free-wheeling of wheel 10. Upon venting of air line 56 to the atmosphere, the air chamber 48 is permitted to expand assisted by a compression spring 49 to return the clutch ring 40 to its engaged position with coupler 28.

As can be seen in FIG. 2, the space or cavity 64 surrounding the clutch ring 40 is sealed off from the surrounding environment. Most notably a rotary seal 60 is carried by the annular actuator 42 and has sealing lips 62 that slidably engage the rotating CV-joint 18 to thereby prevent contaminated air from leaking past the annular ring and into the cavity 64.

Figure 4:
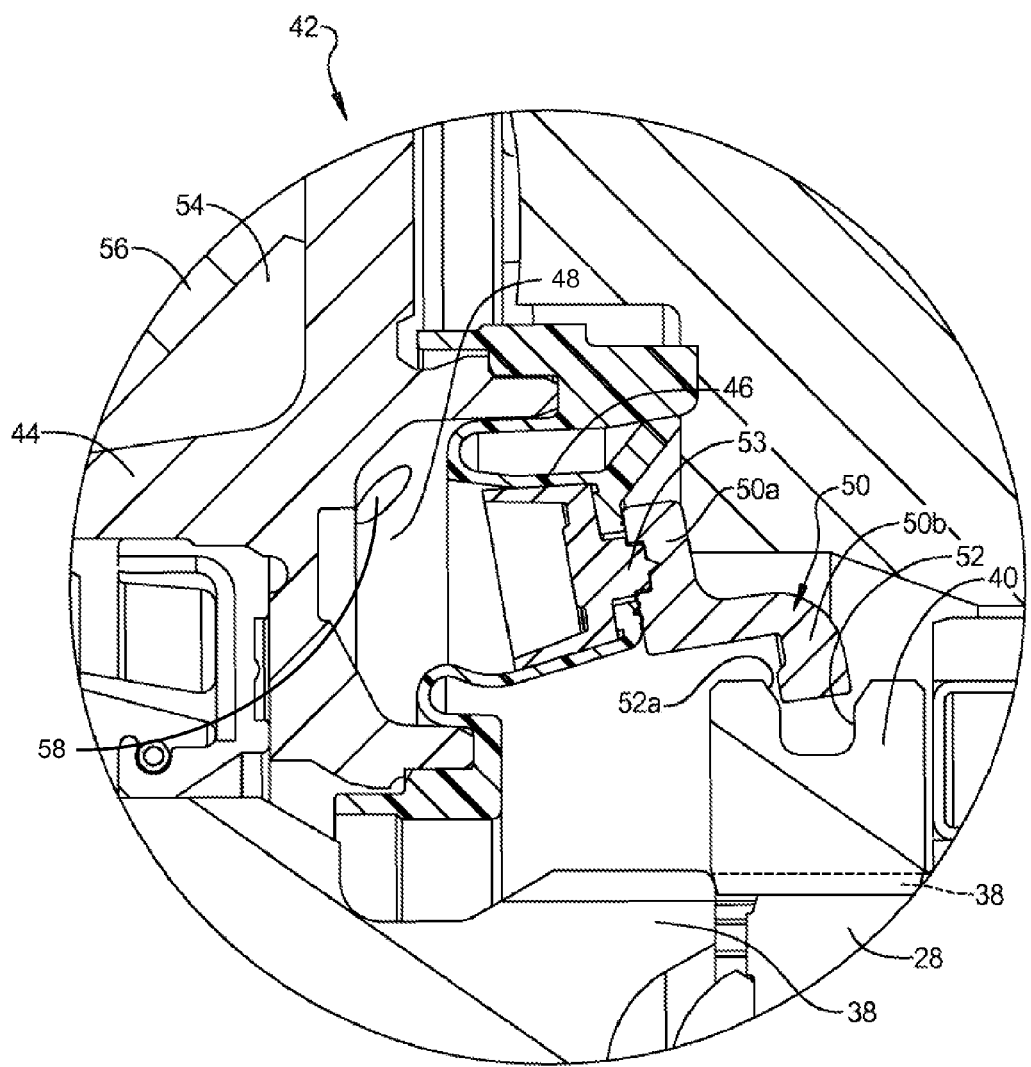
FIG. 4 is a partial cross section view showing a portion of the annular actuator and clutch ring shown in a misalignment position during assembly with the actuator assembly compliantly deflected.

During assembly of the constant velocity joint half shaft 18, a misalignment of the internal spline teeth of the clutch ring 40 with the external spline teeth 36 on the CV-joint half shaft 18 will cause the clutch ring 40 to move axially against the bearing assembly 16, as shown in FIG. 4. The dual stage stop feature 46a engages the side wall 14a of the knuckle 14 and compliantly pivots radially outward and thereby causes the shift fork 50 to deflect and pivot as illustrated in FIG. 4. When the shift fork 50 is deflected and pivoted as shown in FIG. 4, the chamfered edge 52a of the bearing groove 52 allows the slotted L-shaped section 50b to compliantly deflect and pivot outward relative to the bearing groove 52. The slots in the L-shaped section 50b of the shift fork 50 allow the deflection of the shift fork 50. The deflected and pivoted shift fork 50 experiences a tolerable amount of compliant distortion that maintains the integrity of the actuator assembly 42 without incurring any damage. The elastomeric stage of the dual stage stop 46a reduces the axial load on the splines of the clutch ring and constant velocity half shaft teeth 36 thereby allowing the teeth to engage each other as soon as there is a rotation of the CV joint shaft 18 relative to the clutch ring 40.

Figure 7:
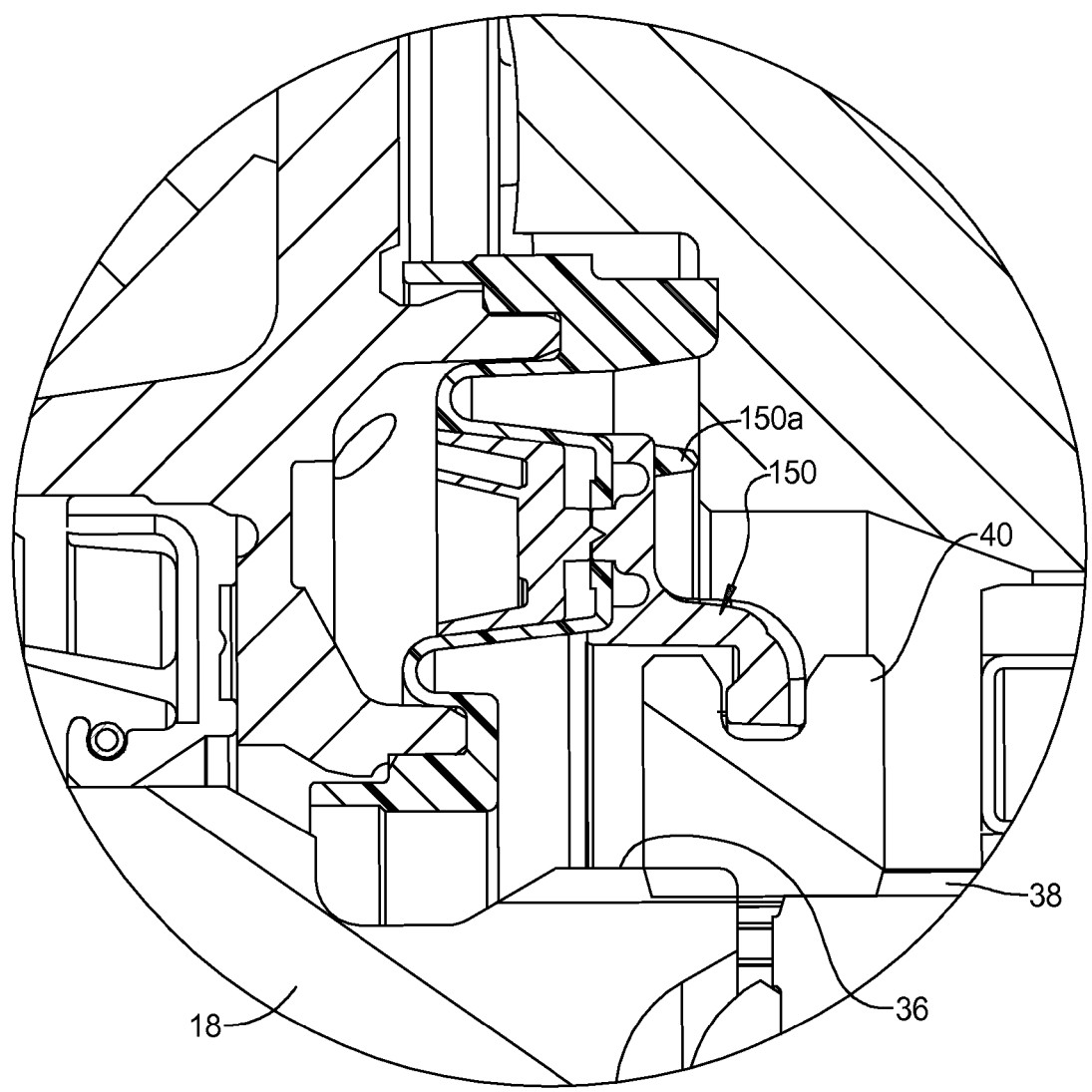
FIG. 7 is an enlarged illustration in cross section of the wheel end and components including an annular actuator designed in accordance with a further embodiment of the present invention.

As an alternative design as illustrated in FIG. 7, the shift fork 150 can be provided with an annular compliant fulcrum stop feature 150a around a perimeter of a base portion 150b. The compliant fulcrum stop feature 150a operates in a manner similar to the dual stage stop feature 46a of the diaphragm 46, as discussed above in the embodiment of FIGS. 2-6, to cause the shift fork 150 to deflect and pivot when a misalignment of the internal spline teeth of the clutch ring 40 with the spline teeth 36 on the CV-joint half shaft 18 occurs during assembly. The compliant fulcrum stop feature 150a can be bonded to the base portion 150b by molding an elastomeric material to the base portion 150b. The stop feature 150a can be formed in other ways, from other materials and can be adhered to the base portion 150b in other ways.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wheel end of a vehicle comprising:
   a knuckle;
   a wheel and wheel hub rotatably mounted to the knuckle;
   a constant velocity joint positioned adjacent the wheel hub and a clutch ring slidable between positions of interlocked engagement with one of said wheel hub and constant velocity joint and both of said wheel hub and constant velocity joint; and
   a pneumatic annular actuator positioned between said knuckle and said constant velocity joint and mounted to said knuckle, said actuator including an air chamber having an elastomeric diaphragm wall movable upon pressurization and depressurization of said air chamber, said movable wall connected to a shift fork that is engaged with said clutch ring for movement of said clutch ring between said positions as the air chamber is pressurized and depressurized, and an air passage extended into said air chamber and an air line connected to said passage and connected to an air pressure source for directing air into and out of said air chamber, said shift fork including an annular base portion, an L-shaped section extending from the annular base portion, and a compliant stop extending from the annular base portion to a side wall of the knuckle, the compliant stop engaging the side wall of the knuckle, axially relative to an axis of the annular base portion at a location radially outward of the L-shaped section and radially inward of an axially extending protrusion of the elastomeric diaphragm wall.

2. The wheel end according to claim 1, wherein said L-shaped section includes a plurality of slots therein.

3. The wheel end according to claim 1, wherein a space is disposed between the side wall of the knuckle and the annular base portion of the shift fork when the clutch ring is engaged with both of said wheel hub and constant velocity joint.

4. The wheel end according to claim 1, wherein said shift fork is capable of deflecting and pivoting so that said L-shaped section is moved radially outward relative to a groove in said clutch ring.

5. The wheel end according to claim 4, wherein said groove in said clutch ring has a chamfered edge to allow said L-shaped section to move radially relative thereto.

6. The wheel end according to claim 4, wherein said shift fork is capable of deflecting and pivoting radially outward and toward the axially extending protrusion of the elastomeric diaphragm wall.

7. The wheel end according to claim 1, wherein the compliant stop extends axially toward the side wall of the knuckle at a radial level of an outer sidewall of an annular piston ring coupled to the elastomeric diaphragm wall.

8. The wheel end according to claim 1, wherein the compliant stop is molded to the annular base portion of the shift fork.

9. The wheel end according to claim 1, wherein the compliant stop is annular and disposed around a perimeter of the annular base portion of the shift fork.

10. A wheel end of a vehicle comprising:
a knuckle;
a wheel and wheel hub rotatably mounted to the knuckle;
a constant velocity joint positioned adjacent the wheel hub;
a clutch ring slidable between positions of interlocked engagement with one of said wheel hub and constant velocity joint and both of said wheel hub and constant velocity joint; and
a pneumatic annular actuator positioned between a side wall of said knuckle and said constant velocity joint and mounted to said knuckle, said actuator including an air chamber having an elastomeric diaphragm wall movable upon pressurization and depressurization of said air chamber, said diaphragm wall connected to a shift fork that is engaged with said clutch ring for movement of said clutch ring between said positions as the air chamber is pressurized and depressurized, and an air passage extended into said air chamber and an air line connected to said passage and connected to an air pressure source for directing air into and out of said air chamber, said shift fork including an annular base portion and an L-shaped section extending from the annular base portion, wherein said elastomeric diaphragm wall includes a compliant stop extending axially therefrom toward the side wall of the knuckle at a location radially outward of the shift fork and radially inward of a higher, axially extending second protrusion of the elastomeric diaphragm wall.

11. The wheel end according to claim 10, wherein said L-shaped section includes a plurality of slots therein.

12. The wheel end according to claim 10, wherein said compliant stop engages the side wall of said knuckle and extends axially from the elastomeric diaphragm wall and past the annular base portion of the shift fork.

13. The wheel end according to claim 10, wherein said shift fork is capable of deflecting and pivoting radially outward, and toward the second protrusion, so that said L-shaped section is moved radially outward relative to a groove in said clutch ring.

14. The wheel end according to claim 13, wherein said groove in said clutch ring has a chamfered edge to allow said L-shaped section to move radially relative thereto.

15. The wheel end according to claim 10, wherein the compliant stop extends axially toward the side wall of the knuckle at a radial level of an outer sidewall of an annular piston ring coupled to the elastomeric diaphragm wall and wherein the annular base portion of the shift fork is coupled to the annular piston ring and the L-shaped section of the shift fork is coupled to the clutch ring.

16. The wheel end according to claim 10, wherein the compliant stop engages the side wall of the knuckle and a space is disposed between the side wall of the knuckle and the annular base portion of the shift fork when the clutch ring is engaged with both of said wheel hub and constant velocity joint.

* * * * *